(12) United States Patent
Bray

(10) Patent No.: US 6,543,060 B2
(45) Date of Patent: Apr. 8, 2003

(54) METHOD AND APPARATUS FOR SECURING AN ARTICLE OF CLOTHING TO AN ANIMAL

(76) Inventor: Irene Bray, 951 Canyon View #303, Sagamore Hills, OH (US) 44067

( * ) Notice: Subject to any disclaimer, the term of this patent is extended or adjusted under 35 U.S.C. 154(b) by 0 days.

(21) Appl. No.: 09/912,180

(22) Filed: Jul. 24, 2001

(65) Prior Publication Data

US 2003/0019012 A1 Jan. 30, 2003

(51) Int. Cl.⁷ .................................................. A42B 1/00
(52) U.S. Cl. .......................................... 2/171; 119/850
(58) Field of Search ............ 2/171, 183, 171.01–171.04, 2/202–208, 209.12, 175.1, 175.3, 175.4, 175.5, 410, 417–425, DIG. 11, 906; 119/814, 857, 850

(56) References Cited

U.S. PATENT DOCUMENTS

| | | | |
|---|---|---|---|
| 1,880,819 A | | 10/1932 | Collins |
| 2,623,213 A | | 12/1952 | Provitola et al. |
| 2,673,350 A | | 3/1954 | Chuck |
| 3,008,145 A | | 11/1961 | Austin et al. |
| 3,020,555 A | | 2/1962 | Taylor |
| 3,234,563 A | | 2/1966 | Tabbat |
| 5,469,583 A | * | 11/1995 | Akeley et al. .................. 2/421 |
| 5,515,546 A | * | 5/1996 | Shifrin .......................... 2/410 |
| 5,519,895 A | * | 5/1996 | Barnes .......................... 2/422 |
| 5,603,121 A | | 2/1997 | Borkovic et al. |
| 5,893,173 A | | 4/1999 | Bray |
| 6,017,049 A | * | 1/2000 | Spector .................... 280/288.4 |

\* cited by examiner

Primary Examiner—John J. Calvert
Assistant Examiner—Tejash Patel
(74) Attorney, Agent, or Firm—Fay, Sharpe, Fagan, Minnich & McKee LLP

(57) ABSTRACT

An animal hat and a method for securing an animal hat to an animal are disclosed. The animal hat includes the hat, a shell and a securing means or a harness joined directly to the shell of the hat. The securing means or harness includes two straps, each having two loose ends which are movably secured to the shell of the hat. The two straps pass under the animal's muzzle and may be arranged so as to cross each other under the animal's muzzle or to extend in a generally parallel manner.

11 Claims, 4 Drawing Sheets

METHOD AND APPARATUS FOR SECURING AN ARTICLE OF CLOTHING TO AN ANIMAL

BACKGROUND OF THE INVENTION

The present invention relates to the art of securing an article of clothing to an animal. It finds particular application in conjunction with securing a hat to the head of a dog, and will be described with particular reference thereto. However, it should be appreciated that the present invention may also find application in conjunction with other methods and devices for securing protective and fanciful articles of clothing to dogs and other animals.

It is known that dog owners occasionally clothe their pets with various articles. It is desirable for an article to remain secured to the animal regardless of the animal's activities (e.g., running, jumping, rolling-over, laying down, sitting, etc.). It is also necessary that the method of attaching the hat to the animal's head be quick, easy and economical to manufacture. With certain articles, security is not an issue. For instance, a dog sweater may include a central portion, which secures around the dog's body, and/or one or more leg openings for receiving the dog's legs therein. In addition, a bandana may be secured around a dog's neck by simply tying the ends of the bandana together. However, securing a hat to a dog's head has, heretofore, not been easily accomplished.

With any method of securing an article to an animal, an important issue is the comfort of the animal. In particular, most dogs will not tolerate a hat secured to their head if the securing means interferes with the dog's movement or interferes with any part of the dog's body, such as the dog's ears.

Accordingly, it has been considered desirable to develop a new and improved article and method for securing the article to an animal, which meets all of the above-mentioned needs and overcomes the foregoing difficulties while providing better and more advantageous results.

The method and apparatus for securing an article of clothing to an animal (U.S. Pat. No. 5,893,173) accomplishes many of these goals. However, several shortcomings are also noted:

1. Fitting the hat to the head of an animal first requires adjusting strap 32 and loop 38. This loop 38 must be made longer or shorter by pulling the strap 32 through apertures 24b or 24c as explained in Column 3, lines 36 and 37. This creates an excess or shortage in strap 32 which must then be threaded through ring 30 and finally through apertures 24a and 24d. This process is time consuming and potentially frustrating.
2. While the adjustment process is only necessary once for a particular dog, it must be performed each time the hat is placed on a different dog, even if their heads appear to be fairly similar in size.
3. The harness arrangement is confusing. Should strap 32 be pulled from the hat entirely, reattaching the strap would require a pet owner to follow elaborate instructions.
4. This method is expensive to manufacture. It requires the inner band 12 to be attached to the outer shell 10. It requires apertures 24a, 24b, 24c, and 24d to be inserted in band 12. A ring 30 is required. Finally, strap 32 must be threaded through aperture 24a, ring 30, apertures 24b and 24c, again through ring 30 and finally through aperture 24d. The added components and assembly render this method prohibitively expensive to manufacture.

SUMMARY OF THE INVENTION

In accordance with one aspect of the present invention, a hat for an animal is disclosed. The hat includes a shell and a harness arrangement comprising two straps. Each strap has two loose ends that are movably secured to the shell of the hat in appropriate locations. The straps cross each other under the muzzle of the animal.

In accordance with another aspect of the present invention, a hat includes a shell and a harness arrangement comprising two straps. Each strap has two loose ends that are movably secured to the shell of the hat in appropriate locations, but the straps do not cross each other under the animal's muzzle, instead running generally parallel to each other.

In accordance with yet another aspect of the present invention, a hat for an animal is disclosed. The hat includes a shell and a harness arrangement comprising two straps. Each strap has two ends that are secured in a fixed manner to the shell of the hat in appropriate locations.

In accordance with still another aspect of the present invention, a method for securing a hat to an animal is disclosed. The method includes placing the hat on the head of the animal, inserting the muzzle of the animal through a loop formed by a first strap and inserting the muzzle of the animal through a loop formed by a second strap. The first strap is moved to a point beneath the muzzle of the animal and the second strap is moved to a point beneath the muzzle.

One advantage of the present invention is the provision of an article which secures instantaneously to the animal.

Another advantage of the present invention is the provision of an article, which adjusts for size, instantly to the animal.

Yet another advantage of the present invention is the provision of an article which is easily manufactured.

A still further advantage of the present invention is the provision of a method for securing a hat to the head of an animal that does not necessitate the manual dexterity required of tying a bow under the chin of a restless and/or resisting animal.

Yet a further advantage of the present invention is the provision of a method for securing a hat to the head of an animal that does not necessitate the manual dexterity required of tying and untying bows and knots in long hair under the chin of a twisting and/or squirming animal.

Still another advantage of the present invention is the provision of a method for securing a hat to the head of an animal that while it adjusts instantly to different sized dog heads, the size can still be adjusted for dramatically different sized dogs. Thus a hat fitted for a St. Bernard sized head can be adjusted to fit the head of a toy Poodle.

BRIEF DESCRIPTION OF THE DRAWINGS

The invention may take form in various components and arrangements of components and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
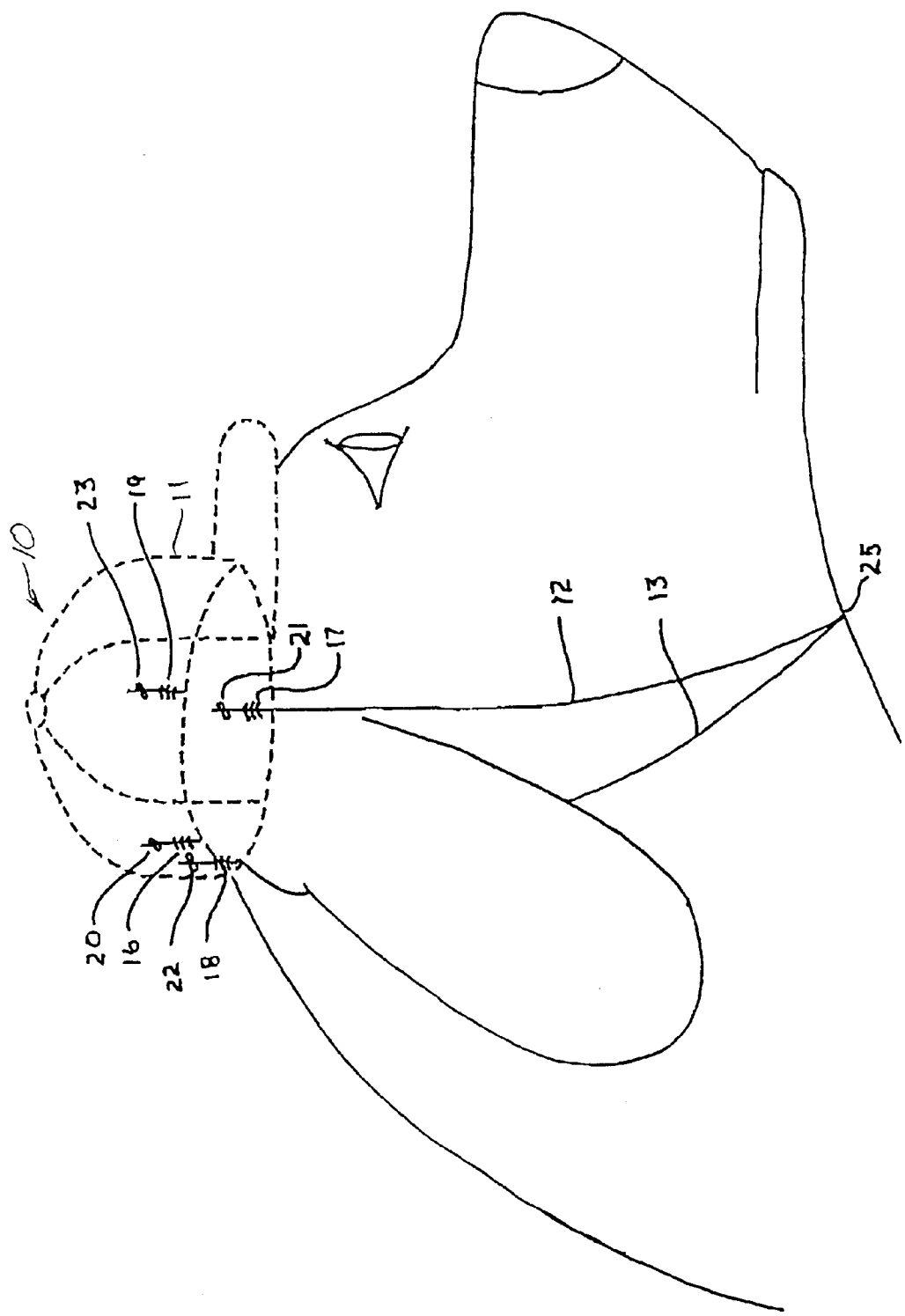
FIG. 1 is a side view of a dog having a hat secured thereto in accordance with a first embodiment of the present invention.

With reference to FIG. 1, an animal such as a dog, has an article, and more particularly, a hat 10 secured on top of its head in accordance with a first embodiment of the present invention.

Figure 2:
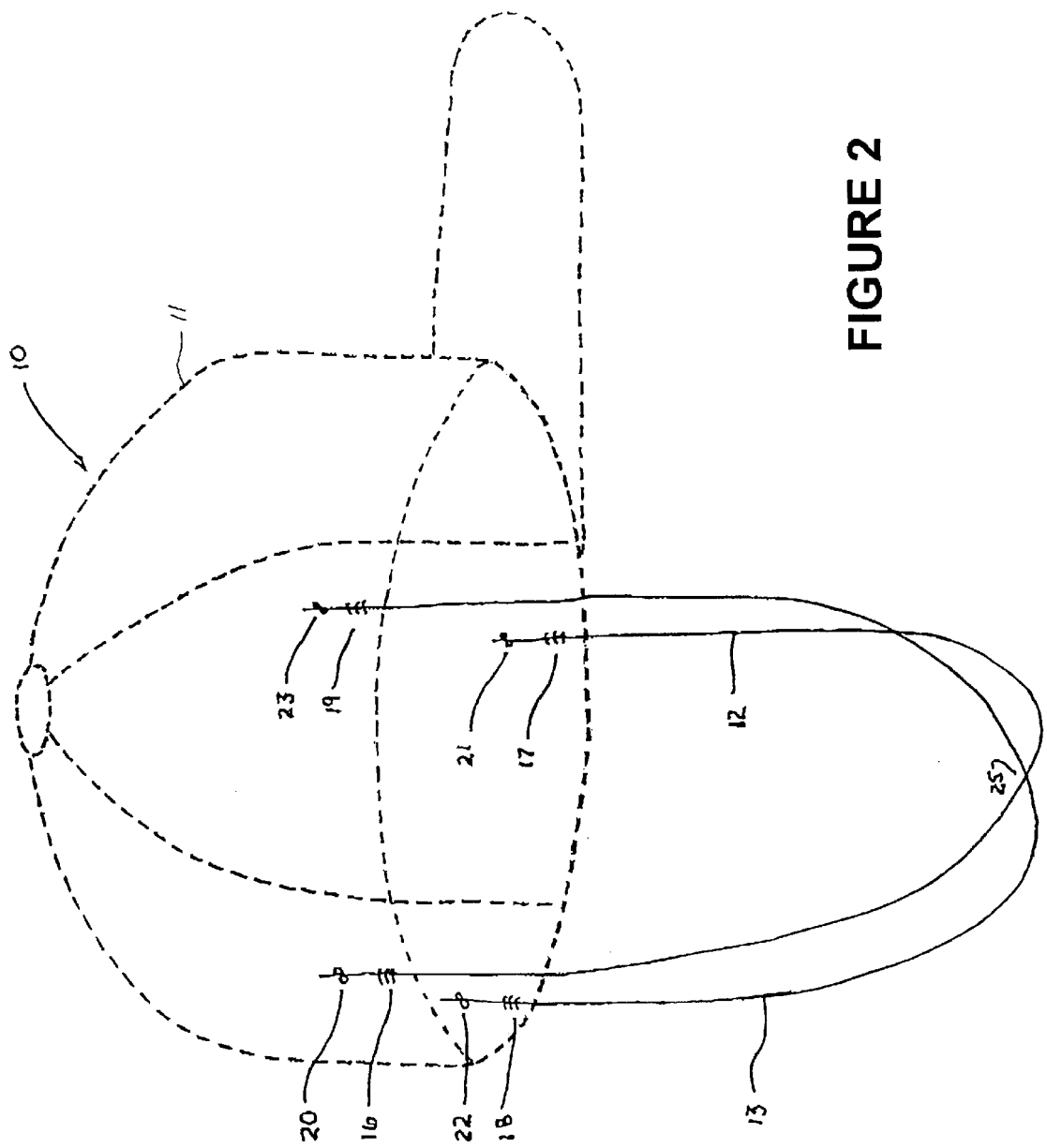
FIG. 2 is an enlarged perspective side view of the hat of FIG. 1.
Figure 3:
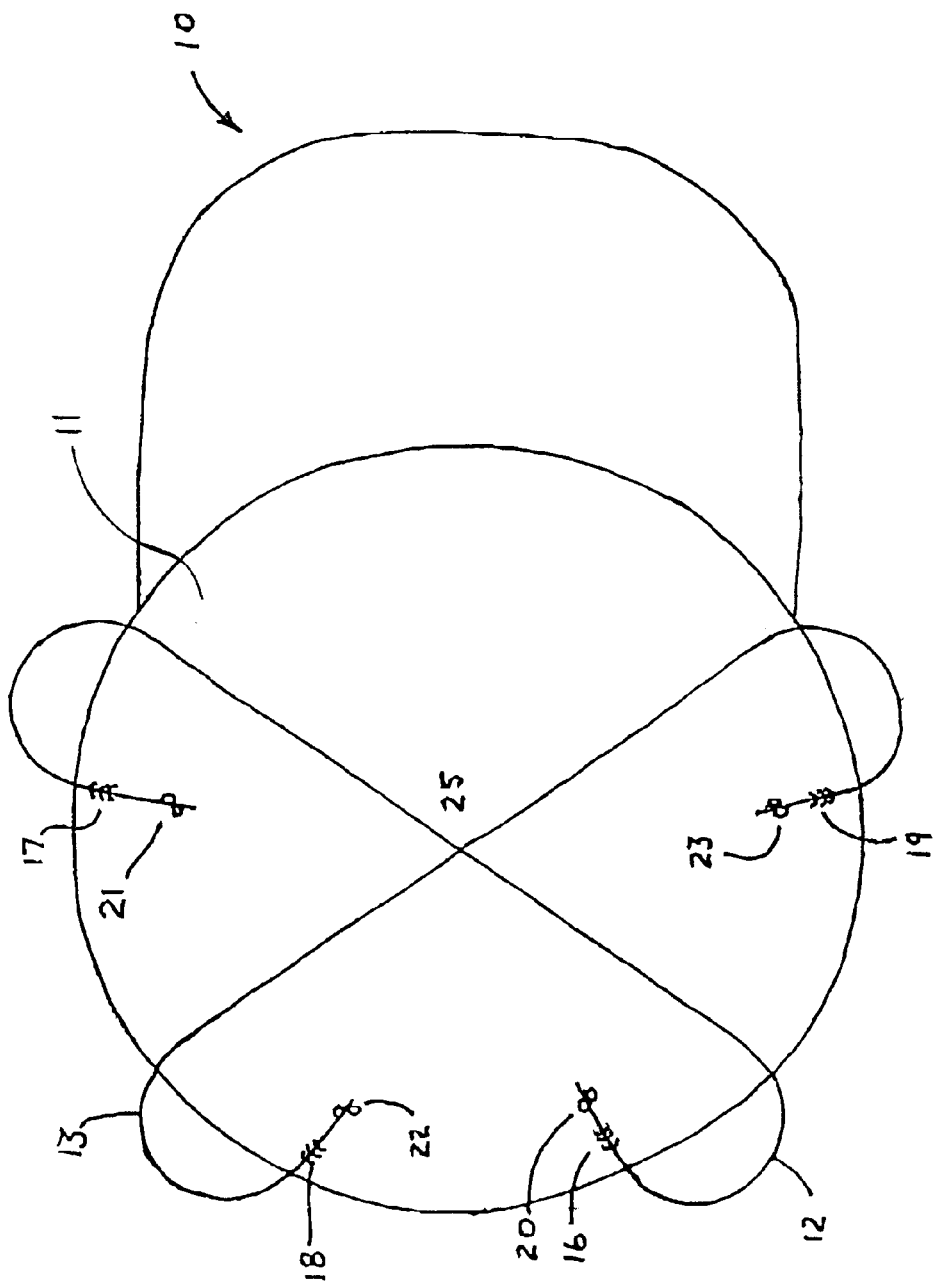
FIG. 3 is a bottom plan view of the hat of FIG. 1.

With continuing reference to FIG. 1 and particular reference to FIGS. 2 and 3, the hat 10 includes an outer shell 11 (shown in phantom) and a securing means or a harness consisting of two straps 12 and 13. A first strap 12 is attached to the hat by stitching at points 16 and 17. The loose ends of the strap 12 protrude beyond the stitching at points 16 and 17 and may be knotted at points 20 and 21. The stitching 16 and 17 enables the strap 12 to slide back and forth providing further adjustment for size. The knots 20 and 21 prevent the ends of the strap 12 from easily sliding through the stitching 16 and 17, thereby preventing accidental removal of the strap 12. In addition, the stitching 16 and 17 and/or the knots 20 and 21 may be designed to secure the strap 12 in a fixed position.

A second strap 13 is attached to the hat with stitching at points 18 and 19. The loose ends of the strap 13 protrude beyond the stitching at points 18 and 19 and may be knotted at points 22 and 23. The stitching 18 and 19 enables the strap 13 to slide back and forth providing further adjustment for size. The knots 22 and 23 prevent the ends of the strap 13 from easily sliding through the stitching 18 and 19, preventing accidental removal of the strap 13. The stitching 18 and 19 and/or knots 22 and 22 may also be designed to secure the strap 13 in a fixed position. In this embodiment, straps 12 and 13 cross each other at a point 25. The point 25 is typically at a location below the animal's muzzle when the hat is secured.

It should be appreciated that the securing means or harness may be attached to different types of outer shells 11. For instance, the outer shell 11 may be in the form of a baseball hat (as shown in FIGS. 1–4), a mortarboard, a cowboy hat, a chef's hat, a tiara, a fireman's hat, a beach hat, a visor, a top hat, a sailor's hat, a touring cap, a fisherman's hat, a Santa's hat, a Robin Hood's hat, a Maid Marion's hat, a Sherlock Holmes' hat, etc.

Comparable securing means may also be utilized. Such securing means may be attached to the outer shell in such a manner to make them adjustable. Alternatively, the securing means or harness straps may be attached to the outer shell in a fixed manner that prevents adjustment. The securing means or harness straps may be a attached to the outer shell utilizing a variety of methods, including stitching, stapling, fastening, tying, threading through a hole in the outer shell, etc.

In the embodiment being described, the straps 12 and 13 are made of elastic material. However, the straps 12 and 13 may consist of any kind of material that is resilient or non-resilient. Examples of resilient materials include elastic and rubber products. Examples of non-resilient materials include cord, string, shoe string, ribbon, etc.

When the securing means or harness is attached as described above and is placed on a dog's head, the first strap 12 extends from the knot 20, through the stitching 16 behind the dog's left ear, under his muzzle and crosses over or under the second strap 13 at the point 25, moves upward in front of his right ear, through the stitching 17 and to the knot 21. The second strap 13 extends from the knot 22, through the stitching 18, behind the dog's right ear, under his muzzle and crosses over or under the first strap 12 at the point 25, moves upward in front of the dog's left ear through the stitching 19 and to the knot 23.

Figure 4:
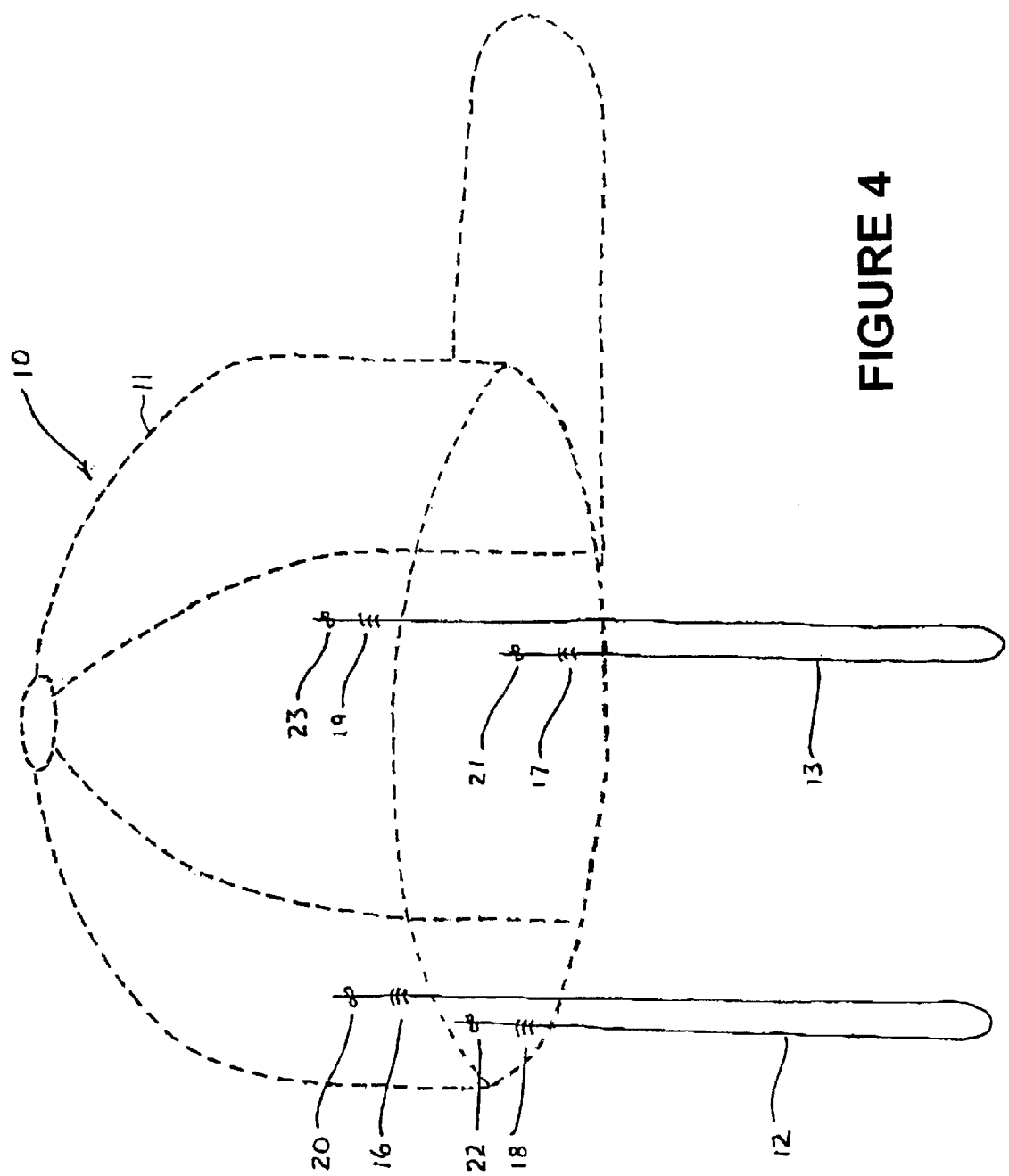
FIG. 4 is an enlarged perspective side view of a hat in accordance with a second embodiment of the present invention.

Referring now to the embodiment shown in FIG. 4, a hat 10 includes an outer shell 11 (shown in phantom) and a securing means or a harness consisting of two straps 12 and 13. A first strap 12 is attached to the hat by stitching at points 16 and 18. The loose ends of the strap 12 protrude beyond the stitching at points 16 and 18 and may be knotted at points 20 and 22. The stitching 16 and 18 enables the strap 12 to slide back and forth, permitting further adjustment for size. The knots 20 and 22 prevent the ends of the strap 12 from easily sliding through the stitching 16 and 18, preventing accidental removal of the strap 12. The stitching 16 and 18 and/or knots 20 and 22 may also be designed to secure the strap 12 in a fixed position. A second strap 13 is attached to the hat with stitching at points 17 and 19. The loose ends of the second strap 13 protrude beyond the stitching at points 17 and 19 and may be knotted at points 21 and 23. The stitching 17 and 19 enables the strap 13 to slide back and forth, permitting further adjustment for size. The knots 21 and 23 prevent the ends of the strap 13 from easily sliding through the stitching 17 and 19, preventing accidental removal of the strap 13. The stitching 17 and 19 and/or the knots 21 and 23 may also be designed to secure the strap 13 in a fixed position. In this embodiment, the straps 12 and 13 are generally parallel to each other in an unsecured position.

As in the embodiment shown in FIGS. 1–3, the securing means of the embodiment shown in FIG. 4 can be adjustable or fixed. Additionally, it should be appreciated that the securing means may be attached to different types of outer shells 11. For instance, the outer shell 11 may be in the form of a baseball hat (as shown in FIGS. 1–4), a mortarboard, a cowboy hat, a chef's hat, a tiara, a fireman's hat, a beach hat, a visor, a top hat, a sailor's hat, a touring cap, a fisherman's hat, a Santa's hat, a Robin Hood's hat, a Maid Marion's hat, a Sherlock Holmes' hat, etc.

In the embodiment described in FIG. 4, the straps 12 and 13 are made of elastic. However, the straps 12 and 13 may consist of any kind of material that is resilient or non-resilient. Examples of resilient materials include elastic and rubber products. Examples of non-resilient materials include cord, string, shoe string, ribbon, etc.

When the securing means or harness shown in FIG. 4 is attached as described above and is placed on a dog's head, the first strap 12 extends from the knot 20, through the stitching 16 behind the dog's left ear, under his muzzle, behind the dog's right ear, through the stitching 18 and to the knot 22. The second strap 13 extends from the knot 23, through the stitching 19, in front of the dog's left ear, under his muzzle, in front of the dog's right ear through the stitching 17 and to the knot 21.

A method of securing a hat to an animal is also disclosed. The method includes placing a hat having a shell 11 and a harness arrangement including a first strap 12 and a second strap 13, wherein the first strap 12 and the second strap 13 each have two loose ends which are movably secured to the shell 11 of the hat, on the head of an animal. The muzzle of the animal is inserted through a loop formed by the first strap 12 and through a loop formed by the second strap 13. The first strap 12 is moved to a point beneath the muzzle of the animal and the second strap 13 is moved to a point beneath the muzzle of the animal to secure the hat. The method may employ the crossing-strap or parallel strap harness arrangements described above.

The invention has been described with reference to the preferred embodiments. Obviously, modifications and alterations will occur to others upon reading and understanding the proceeding detailed description. It is intended that the invention be construed as including all such modifications and alterations insofar as they come within the scope of the appended claims or the equivalents thereof.

Having thus described the preferred embodiment, the invention is now claimed to be:

1. A hat for an animal, comprising:
   a shell;
   a harness arrangement attached directly to the hat, including a first strap and a second strap, wherein the first strap and the second strap each have two loose ends which are movably secured to the shell of the hat;
   stitching movably securing the loose ends of the first strap and the second strap to the shell of the hat;
   each loose end of the first strap and the second strap including a knot to prevent each loose end from sliding out of the stitching.

2. The hat for an animal of claim 1, wherein the first strap and the second strap cross each other at a point below the muzzle of the animal when the hat is secured.

3. The hat for an animal of claim 1, wherein the first strap and the second strap extend in a generally parallel manner and pass under the muzzle of the animal when the hat is secured.

4. A method of securing a hat to an animal, comprising:
   providing a hat having a shell and a harness arrangement including a first strap and a second strap, wherein the first strap and the second strap each have two loose ends which are movably secured to the shell of the hat;
   placing the hat on a head of the animal;
   inserting the muzzle of the animal through a loop formed by the first strap;
   inserting the muzzle of the animal through a loop formed by the second strap;
   moving the first strap to a point beneath the muzzle of the animal; and
   moving the second strap to a point beneath the muzzle of the animal.

5. The method of claim 4, wherein the first strap and the second strap cross at a point below the muzzle of the animal when the hat is secured.

6. The method of claim 4, wherein the first strap and the second strap extend in a generally parallel manner and pass under the muzzle of the animal when the hat is secured.

7. The method of claim 4, wherein the loose ends of the first strap and the second strap are movably secured to the shell of the hat with stitching.

8. The method of claim 7, wherein each loose end of the first strap and the second strap includes a knot to prevent each loose end from sliding out of the stitching.

9. The method of claim 4, wherein at least one of the first strap and the second strap is of a resilient material.

10. The method of claim 4, wherein at least one of the first strap and the second strap is of a non-resilient material.

11. The method of claim 4, wherein the hat has an outer shell in the form of one of a baseball hat, a mortarboard, a cowboy hat, a chef's hat, a tiara, a fireman's hat, a beach hat, a visor, a top hat, a sailor's hat, a touring cap, a fisherman's hat, a Santa's hat, a Robin Hood's hat, a Maid Marion's hat and a Sherlock Holmes' hat.

* * * * *